Aug. 2, 1949.     G. B. ROBINSON     2,477,827
UNIVERSAL HINGE FOR ARTICULATED JOINTS
Filed Nov. 29, 1947
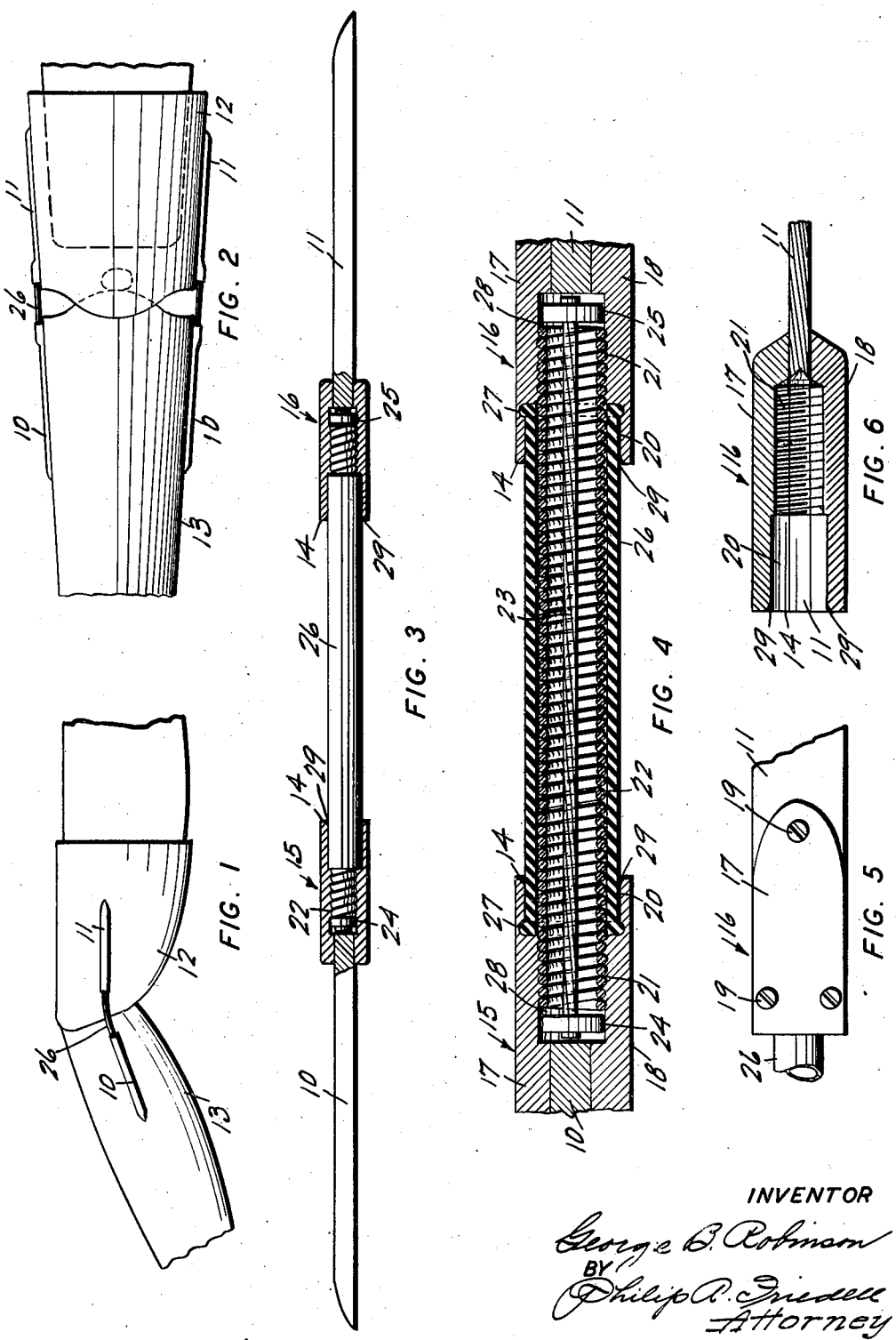
INVENTOR
George B. Robinson
BY
Philip A. Friedell
Attorney Patented Aug. 2, 1949

2,477,827

UNITED STATES PATENT OFFICE 2,477,827

UNIVERSAL HINGE FOR ARTICULATED JOINTS

George B. Robinson, Vallejo, Calif.

Application November 29, 1947, Serial No. 788,792

3 Claims. (Cl. 287—86)

This invention relates to improvements in hinges and connections for articulated members particularly for the knee, ankle, wrist and elbow joints of artificial limbs, and provides a connection which allows twisting movement in connection with hinging movement of members relative to each other, and therefore has a distinct advantage over conventional hinge joints.

With conventional hinge joints, the parts can move or swing only about the axis of the pintle, allowing no twisting movement, and artificial limbs so hinged lack the life-like movement so much desired and which is essential to proper mechanical functioning of the various parts.

With my hinge, the parts can swing as freely as with the conventional pintle hinge while also permitting limited twisting movement, when the hinges are placed on opposite sides of a joint, and when one hinge is used axially between two joints and the joints are connected by a ball-and-socket connection, such as in a wrist or ankle, normal twisting of one part relative to the other is possible.

Unlike other spring hinges, in this hinge the spring can be either closed or restrained such as one which is compressed to closed position by a flexible tie, and with the spring encased in a flexible or elastic sleeve, the sleeve and spring both having their terminal ends anchored in the hinge straps, which are provided with divided heads for convenience in manufacture and assembly.

In describing the invention reference will be made to the accompanying drawings, in which:

Fig. 1 shows an artificial leg with my invention applied thereto.

Fig. 2 is a top plan view of Fig. 1.

Fig. 3 is an enlarged side view of the invention with the strap heads shown in section to show the spring and sleeve connections.

Fig. 4 is a greatly enlarged longitudinal section through the invention with the projecting ends of the straps broken away.

Fig. 5 is an enlarged top plan view of one of the heads showing the method of assembly.

Fig. 6 is an enlarged section through one of the heads.

The invention includes a pair of straps 10 and 11 which are provided with suitable means for attaching to the respective members to be joined, such as the socket 12 to the artificial leg 13, and which extend to the end 14 of the anchoring means or heads 15 and 16.

The heads 15 and 16 each consist of the end portion of the strap 11 and two plates 17 and 18 which are secured together as by screws 19 and bores as indicated at 20, and threaded as indicated at 21, the threads having a pitch equal to the pitch of the closed spring 22.

The spring 22 may be wound closed, or wound to a pitch slightly greater than the diameter of the wire, about equal to about 1.2 times the diameter of the wire, after which a cable 23 having a head 24 fixed on one end is passed through the hinge. With the spring formed to the increased pitch the spring is compressed to an almost closed position by a head 25 slipped over the other end of the cable and with the cable drawn taut, the head is fixed on the cable, thus firmly holding the spring in the substantially closed position with just enough freedom to permit bending or hinge action.

A sleeve 26 of flexible, slightly elastic material is slipped over the spring, and this sleeve is preferably provided with a bead 27 at each end to lock the ends in the heads 15 and 16, a suitable material for the sleeve being a vinyl-resin plastic which is very flexible and slightly elastic, though live rubber can also be used. Slight elasticity is essential to allow for the bending action, and synthetic rubber is more suitable than natural rubber because of its limited elasticity. This bead 27 permits the sleeve to be placed and maintained under tension to prevent bulging or cocking of the spring.

To assemble the hinge, one end of the assembly of cable, spring and sleeve is placed in the opening made in the strap 11, with the end of the spring located in the threaded passage, with the ends of the sleeve located in the counterbore 20, the plates 17 and 18 are placed in position on the strap, the screws 19 inserted and drawn up tight, which locks the end of the spring securely in the threaded bore and the sleeve end in the plain bore 20. The other end of the hinge unit is then secured in the other strap in the same way.

As previously outlined, with the spring not tightly closed, a certain amount of spring action is provided between the connected parts to provide a life-like feel and appearance, and the parts can be relatively twisted to a limited degree in either direction, and there will be no chance for any clicking of the washers 24 and 25 against the walls of the bore.

However, the spring can be wound tightly closed as shown, with slight clearance provided between the ends of the spring and the washers as indicated at 28, under which conditions the hinging action will be more firm and direct and will be limited to that clearance.

The sleeve 23 should not be too elastic as it is intended to maintain the shape of the spring and prevent bulging or cocking, yet must be sufficiently elastic to permit the hinge action. It also serves as a guard for the spring. The edges 29 are arcuately formed to prevent cutting or breaking of the sleeve.

Thus a hinge is provided which is universal, hinging in any direction, and which allows limited twisting of parts and which is economical and easy to manufacture and assemble, and which upon application to an artificial limb will assure positive action coupled with resiliency and freedom of movement, resulting in more life-like action and control of artificial limbs.

I claim:

1. A hinge for an artificial limb comprising a pair of relatively rigid straps for attachment to the respective parts of the limb and connected together by a substantially closed spring having restraining means limiting expansion of the spring to that necessary for hinge action flexure and comprising a cable threaded through the spring and having a head at each end and having said spring under compression to a substantially closed position, and with the ends of the spring fixed in the ends of the respective straps; a flexible, slightly resilient sleeve encompassing said spring to function as a guard and to prevent bulging or buckling of the spring and having its respective ends fixed in the said ends of the respective straps; said ends of said straps including each a plate for each face and with the plates and strap secured together to form a clamping head and having a threaded bore to secure the end of said spring and a counterbore to secure the end of the sleeve, and being secured together with said spring and sleeve in place for positively securing the spring and sleeve therein.

2. A universal hinge comprising; a substantially closed spiral spring having a cable passing therethrough and terminating in a head at each end to cooperate with the ends of the spring and limiting the spring to a predetermined degree of flexure, and a flexible sleeve encompassing the spring throughout the greater portion of its length, and anchoring means for the respective ends of the spring and of the sleeve; said spring being compressed to a substantially closed condition by said cable between said heads, to provide a predetermined degree of resiliency for direct thrust and necessary expansion of one side of the spring for the hinge action; said flexible sleeve being formed of elastic material and closely fitting said spring and having the respective ends thereof anchored in said anchoring means under tension to tightly close the spring while permitting flexure, and holding said spring against bulging or cocking; said anchoring means comprising, for each end of the spring, a strap and a plate secured on each side thereof to form an anchoring head and having a threaded bore to lock the end of the spring and a counterbore for securing the end of the sleeve, said sleeve having a length less than the length of the spring to permit separate anchoring.

3. In a hinge including a closed spiral spring and a tension member within said spring for limiting flexure and a sleeve encompassing the greater portion of the length of said spring; means for securing the end of the spring comprising three plates and means for securing the three plates together and having jointly a threaded bore and a counterbore common to the three plates, with said threaded bore having a pitch of thread equal to the pitch of the spring to secure the end of the spring, and said counterbore having a diameter slightly less than the outside diameter of the sleeve to secure the sleeve, and with the end of the spring and of the sleeve placed in position in one plate and clamped by the other two plates to provide positive anchoring thereof.

GEORGE B. ROBINSON.

REFERENCES CITED

The following references are of record in the file of this patent:

UNITED STATES PATENTS

| Number | Name | Date |
|---|---|---|
| 317,157 | Lowrie | May 5, 1885 |
| 400,958 | Seely | Apr. 9, 1889 |
| 750,357 | Gibbons | Jan. 26, 1904 |
| 1,527,769 | Ashbrook et al. | Feb. 24, 1925 |
| 2,306,638 | Meisler | Dec. 29, 1942 |